A. E. COTTRELL.
HORIZONTAL TURNABLE TABLE FOR BAND SAWS.
APPLICATION FILED OCT. 20, 1916.

1,250,977.

Patented Dec. 25, 1917.
4 SHEETS—SHEET 1.

Inventor
Archie E. Cottrell.
By
Atty.

A. E. COTTRELL.
HORIZONTAL TURNABLE TABLE FOR BAND SAWS.
APPLICATION FILED OCT. 20, 1916.
1,250,977.
Patented Dec. 25, 1917.
4 SHEETS—SHEET 2.
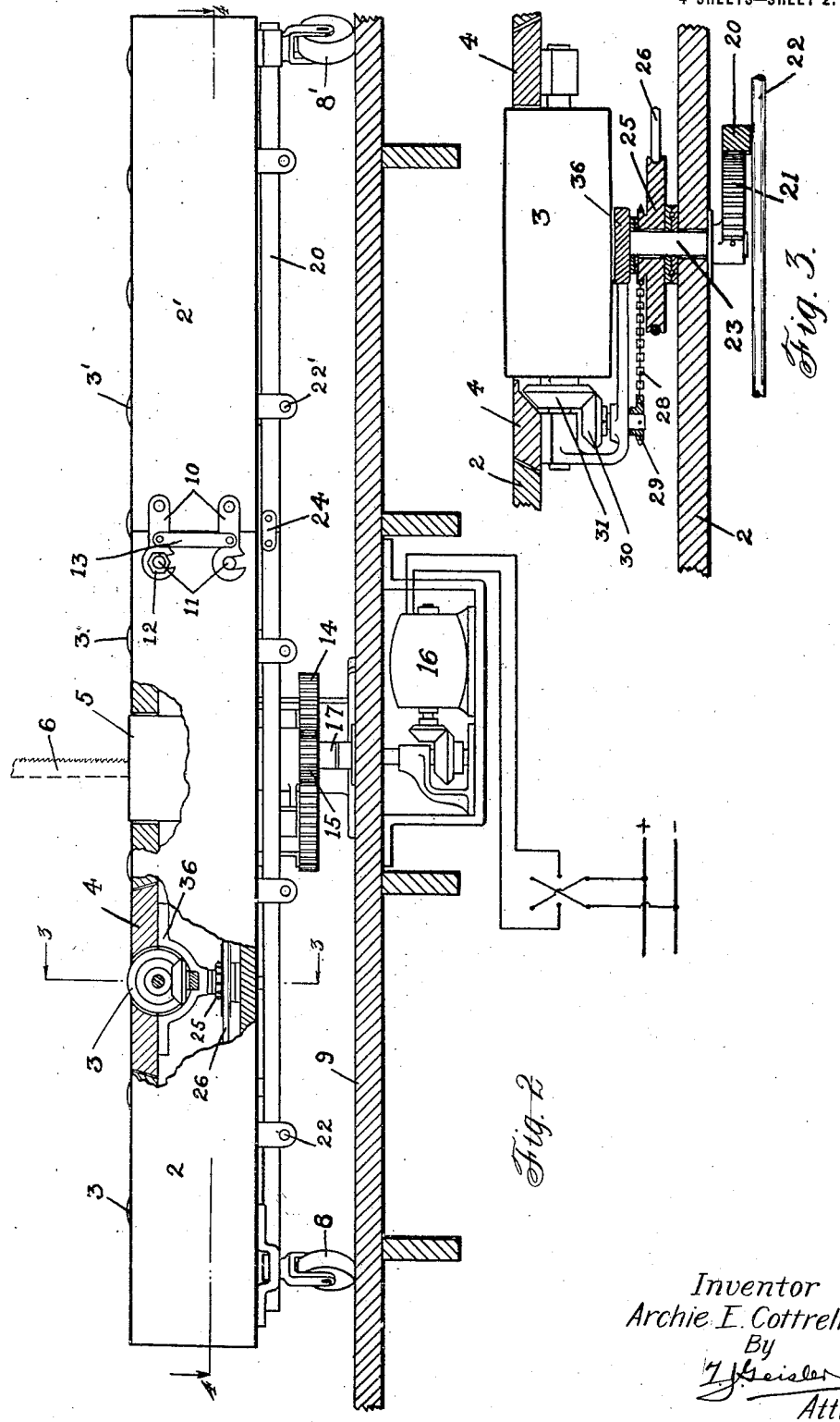
Inventor
Archie E. Cottrell.
By
*J. J. Geisler*
Atty A. E. COTTRELL.
HORIZONTAL TURNABLE TABLE FOR BAND SAWS.
APPLICATION FILED OCT. 20, 1916.

1,250,977.

Patented Dec. 25, 1917.
4 SHEETS—SHEET 3.

Inventor:
Archie E. Cottrell.
By
T. J. Geisler
Atty.

A. E. COTTRELL.
HORIZONTAL TURNABLE TABLE FOR BAND SAWS.
APPLICATION FILED OCT. 20, 1916.

1,250,977.

Patented Dec. 25, 1917.
4 SHEETS—SHEET 4.

Inventor
Archie E. Cottrell
By
Atty.

UNITED STATES PATENT OFFICE.

ARCHIE E. COTTRELL, OF PORTLAND, OREGON, ASSIGNOR OF ONE-FOURTH TO PERCY M. WOOD, OF OREGON CITY, OREGON.

HORIZONTAL-TURNABLE TABLE FOR BAND-SAWS.

1,250,977.   Specification of Letters Patent.   Patented Dec. 25, 1917.

Application filed October 20, 1916. Serial No. 126,804.

*To all whom it may concern:*

Be it known that I, ARCHIE E. COTTRELL, a citizen of the United States, and a resident of Portland, Multnomah county, State of Oregon, have invented a new and useful Improvement in Horizontal - Turnable Tables for Band-Saws, of which the following is a specification.

My invention relates to band saws, and particularly to that class of band saws intended for the cutting of heavy timbers in various shapes, such as are used in the building of ships.

The object of my invention is to provide for such band saws a table which can be turned horizontally around the approximate cutting teeth of the saw into any desired angle, within limits allowed by the upward traveling portion of the band saw, so as to place the timber to be sawed in any desired horizontal position relative to the direction of the cut of the saw; and also to provide in such a turn table a set of live feed rollers which, although moving with the table, will remain with their axes always perpendicular to the plane of cut of the saw, so that such rollers will always feed the timber directly into the cutting edge of the saw. In other words, this feature of my device is so designed that the direction of travel induced by the feed rollers will be constantly maintained parallel with the direction of the cut of the saw.

The general details of construction and operation of my improved saw table can best be understood by having reference to the accompanying drawings, in which:

Fig. 2 is a side elevation of my invention, with parts broken away, showing the mounting of one of the feed rollers therein, and also the means for horizontally turning the saw table;

Fig. 3 is a sectional elevation on the line 3—3 of Fig. 2, looking in the direction pointed by the arrow, and shows in detail one of the feed rollers, and also the roller operating mechanism located on the roller supporting bracket;

Figure 1:
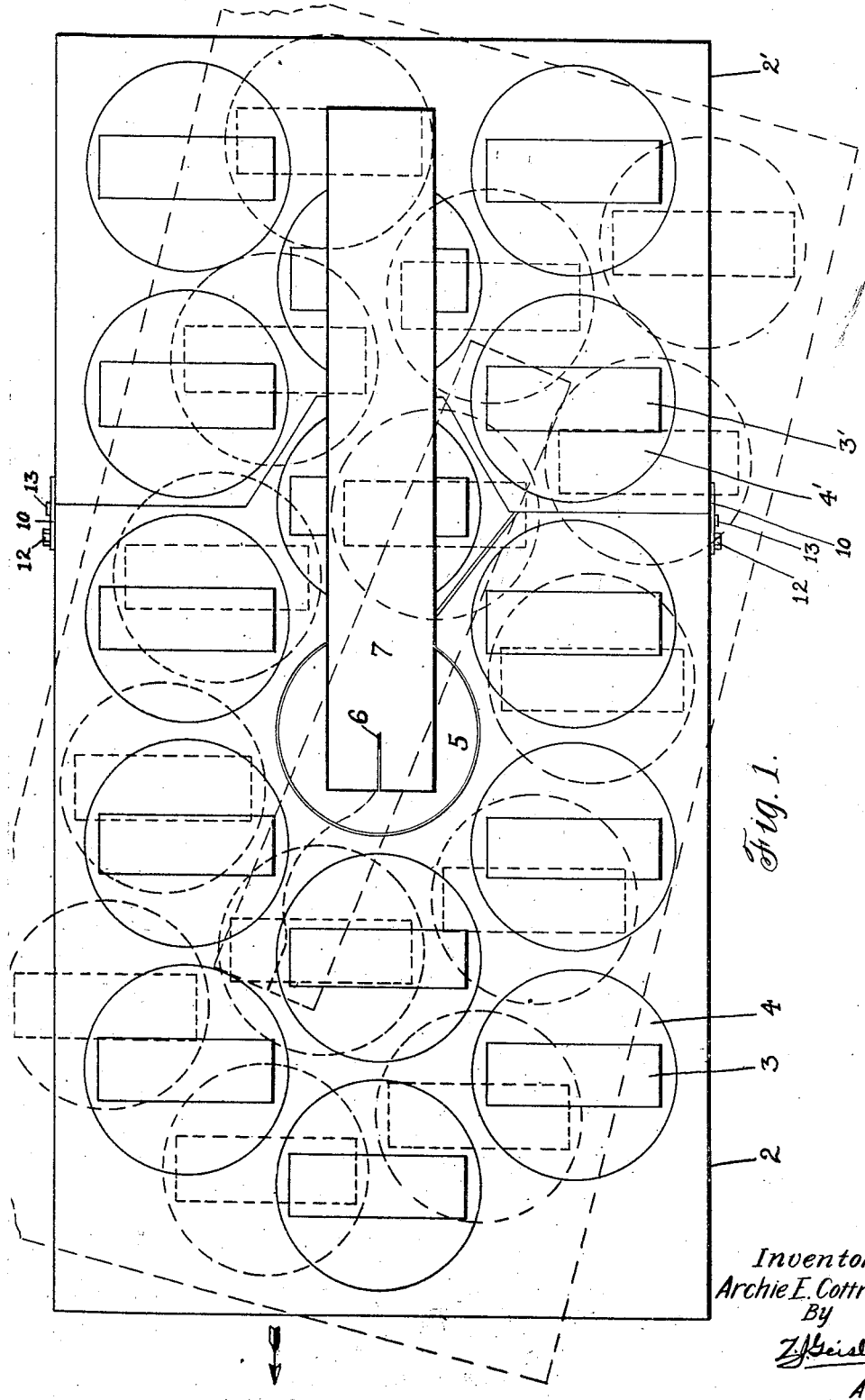
Figure 1 is a diagrammatic top view of my turnable saw table, showing the live rollers; also showing in dotted lines the relative position of the rollers and saw table when the latter has been turned through some degrees.

In the drawings, 2 represents the frame of the saw table; 3 are the feed rollers; 4 the horizontal circular plates mounted on the supports of the feed rollers and adapted to lie flush with the top surface of the saw table; 5 is a stationary pivot block for the saw table, serving also as a guide for the band saw 6; and 7 represents a timber on the saw table in the process of being cut.

An auxiliary, detachable saw-bed section, similar in construction to the main section, is designated by 2'. This auxiliary section is adapted to accommodate long timbers. A series of live rollers in this section are represented by 3', and other parts of mechanism in this section are represented similarly by figures in prime, corresponding to the figures representing like parts in the main section.

8 are rollers or wheels supporting the outer ends of the saw table, and are adapted to roll on the floor 9 of the mill. As a means for securely locking the main and auxiliary saw table sections together I provide hooks 10, studs 11, on one of which may be threaded a nut 12, and a bar 13, connecting the two hooks 10, as shown in Fig. 2.

Figure 5:
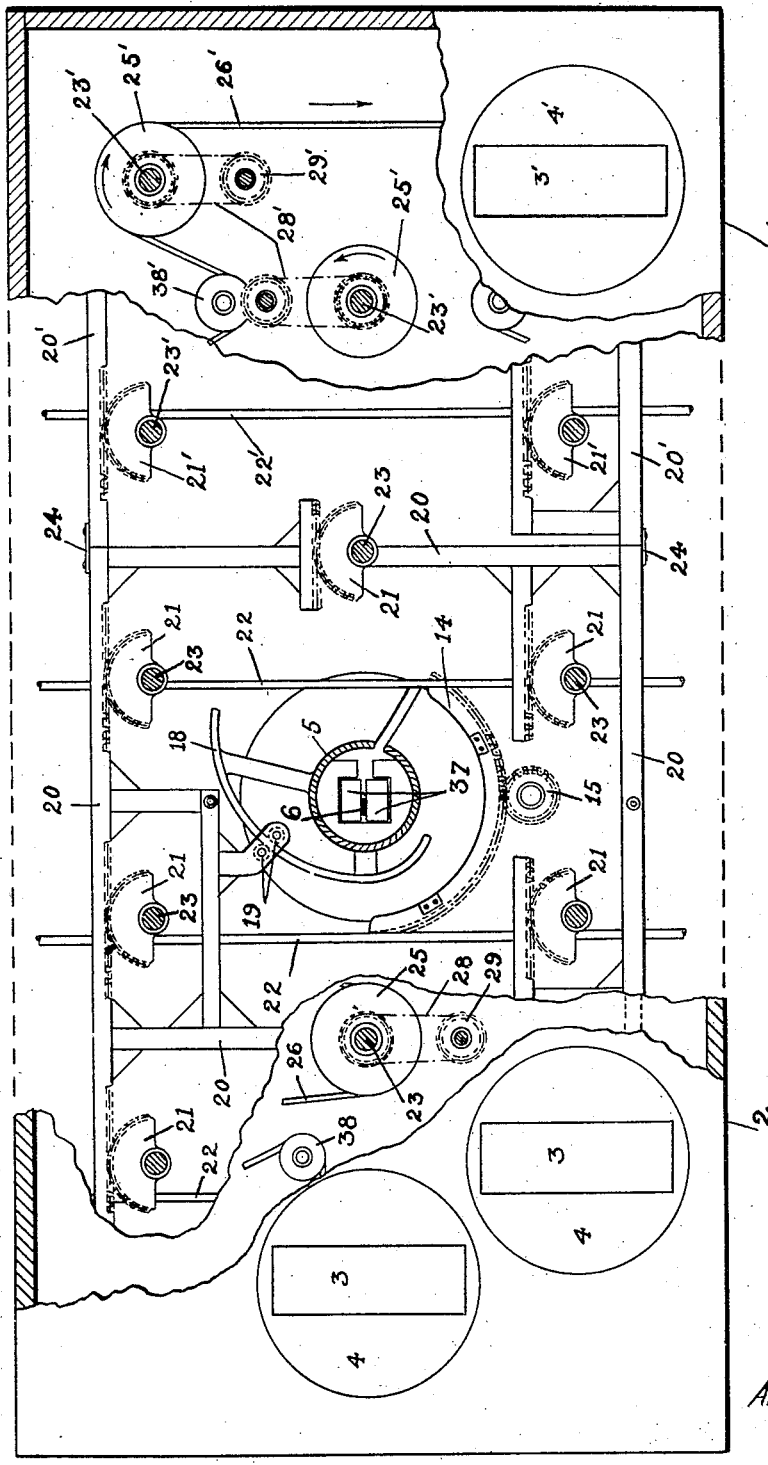
Fig. 5 is a plan view, partly in section, of my device, showing the general arrangement of the parts comprising the same, and also the mechanism of operation.

As a means for horizontally turning the saw table, I mount rigidly to the under side of the same, and concentric with the cylindrical pivot block 5, the sector rack 14. A pinion 15, the axis of which is journaled in a bearing in the mill floor 9, meshes with and turns the rack 14, said pinion being driven by a motor 16, controlled by the reversible clutch 17, the latter being operated by suitably arranged hand or foot levers. In order to keep the feed rollers 3 with their axes always perpendicular to the plane of the cut of the saw, I provide the following mechanism: On the pivot block 5 is rigidly mounted the cam 18. Rollers 19, adapted to roll along the cam 18, are rotatably mounted on an arm of a horizontal rack-bar frame 20 (as shown in Fig. 5), the rack-bar frame 20 being longitudinally slidable on the transverse bars 22, which are rigidly mounted to the under side of the saw table. A similar rack-bar frame 20' is provided on the detachable table section 2' and may be lashed by the tie-plates 24 to the frame 20 and thus actuated by the latter. Meshing with the teeth of the rack bars of the frame 20 are sector gears 21, the latter being rigidly mounted on the vertical shafts 23, which shafts furnish a pivotal support for the rollers 3. The shafts 23 are journaled in the base of the saw table. Rigidly mounted on the upper ends of the shafts 23 are the brackets 36, which bear the feed rollers 3, see Figs. 2 and 3. As the saw table is turned the cam 18 effects a longitudinal movement of the rack bar frame 20, thus causing the sector gears 21 to turn and with them the rollers 3. The cam 18 and sector gears 21 are so designed as to keep the axes of the feed rollers always perpendicular to the cutting plane of the saws, and thus maintain the plane of rotation of the feed rollers in parallel alinement with the cutting plane of the saw.

Figure 4:
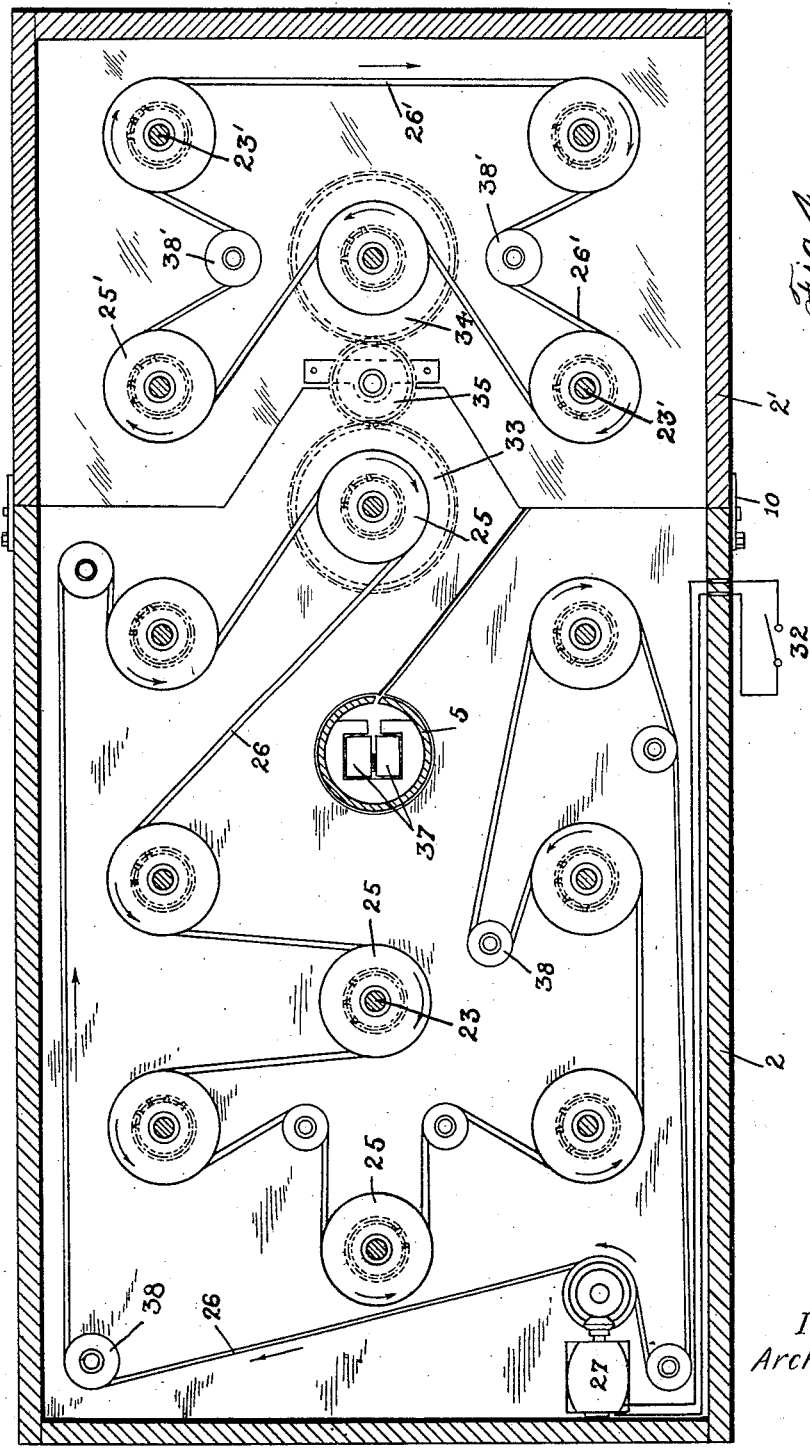
Fig. 4 is a plan section on the line 4—4 of Fig. 2 and shows the transmission mechanism for maintaining the feed rollers in a live state.

The feed rollers are kept constantly in a live state by the following means: On the roller supporting shafts 23 are rotatably journaled the combination pulley and sprocket wheels 25. The latter are kept in constant rotation by a cable (or chain) transmission, as shown in Fig. 4, the cable 26 being driven by a motor 27 and kept in tension by tension pulleys 38; the motor being controlled by the switch 32 placed in convenient reach of the operator. The pulley-sprocket-wheels 25 rotate the feed rollers 3 by means of the endless chain 28, sprocket wheel 29, and beveled gears 30 and 31, as shown in Fig. 3. As evident, when the axis of the feed rollers 3 are oriented within the saw table, the rate of rotation of the feed rollers will be slightly increased or diminished, according to the direction of orientation, due to the chain 28 winding around the wheels 25. However, this change in rate of rotation is negligible, due to the fact that the table is turned very gradually. To overcome any friction between the feed rollers and the timber bearing on the same when the table is turned, I prefer to make my feed rollers slightly convex, (as shown in Fig. 3).

The rollers 3', located in the detachable table section 2', can be made live by providing one of the pulley sprocket wheels on both the main and detachable saw-table sections with gear wheels 33 and 34, and providing the detachable saw-table section 2' with a gear 35, to act as an intermediate between said gears 33 and 34, as shown in Fig. 4.

The stationary cylindrical pivot block 5 is made hollow, as shown in Figs. 4 and 5, to accommodate the rollers 37, which serve as frictionless guides for the band saw. The upper portion of the pivot block 5 (as shown in Figs. 1 and 2) is provided with a flat, horizontal surface adapted to set slightly below the level of the top periphery of the feed rollers in such a position that it will serve as a bearing for that portion of the timber immediately around the saw, but at the same time not produce a friction with the timber that will interfere with the feeding of the latter into the saw.

I claim:

1. In combination with a band-saw, a turnable table having its axis of rotation coincident with the center line of motion of the cutting portion of the band-saw, means for turning said table, adjustable driven means pivoted on an axis perpendicular to the table and operating to feed material to the saw, and means for automatically adjusting said driven means with the turning of said table, whereby the direction of travel induced by the former is maintained parallel with the cut of the saw.

2. In combination with a band-saw, a turnable table having its axis of rotation coincident with the center line of motion of the cutting portion of the band-saw, means for turning said table, adjustable driven means pivoted on an axis perpendicular to the table and operating to feed material to the saw, means for automatically adjusting said driven means with the turning of said table, whereby the direction of travel induced by the former is maintained parallel with the cut of the saw, said table being divided into two sections, each of which is provided with said mechanism, means for securing said sections together, and other means for operatively connecting the mechanism carried by each table section.

3. In a device of the character described, comprising a band-saw, and a turnable table having its axis of rotation coincident with the center line of motion of the cutting portion of the band-saw, a fixed block through which the band-saw travels and about which the table is rotatable, and a guide for the band saw carried by such block.

4. In a device of the character described, comprising a band-saw, and a turnable table having its axis of rotation coincident with the center line of motion of the cutting portion of the band-saw, a fixed block through which the band-saw travels and about which the table is rotatable, the top surface of said block lying in a plane slightly above that of the top of the table but below the tops of the feed rollers, for the purpose specified, and a guide for the band-saw carried by such block.

5. In combination with a band-saw, a turnable table having its axis of rotation coincident with the center line of motion of the cutting portion of the band-saw, means for turning said table, said table being provided with roller-supporting members rotatable about an axis perpendicular to the table, feed rollers supported by said rotatable roller-supporting members, motion transmitting elements in part mounted on the axis of said feed rollers, and driving means for driving the latter operating through the medium of said transmitting elements, and means adapted to maintain the axes of said feed rollers normal to the plane of the cut of the band-saw and being operated by the turning of said table.

6. In combination with a band-saw, a turnable table having its axis of rotation coincident with the center line of motion of the cutting portion of the band-saw, means for turning said table, adjustable driven means pivoted on an axis perpendicular to the table and operating to feed material to the saw, means for automatically adjusting said driven means with the turning of said table, whereby the direction of travel induced by the former is maintained parallel with the cut of the saw, said table being divided into two sections, each of which is provided with said mechanism, means for securing said sections together, and other means for operatively connecting the mechanism carried by each table section.

ARCHIE E. COTTRELL.

Copies of this patent may be obtained for five cents each, by addressing the "Commissioner of Patents, Washington, D. C."